Patented Aug. 3, 1943

2,326,107

UNITED STATES PATENT OFFICE 2,326,107

GUANIDINE AMMONIUM FERROCYANIDE

Urner Liddel, Greenwich, Conn., assignor to American Cyanamid Company, New York, N. Y., a corporation of Maine No Drawing. Original application May 28, 1940, Serial No. 337,629. Divided and this application October 17, 1941, Serial No. 415,427

1 Claim. (Cl. 260—439)

The present invention relates to complex ferrocyanides containing a guanidine and ammonium radicals, as new compounds.

It has been discovered that guanidine ammonium ferrocyanide may be produced by double decomposition in aqueous solution.

For instance, a saturated solution of sodium ferrocyanide, when mixed at room temperature with a saturated solution of guanidine carbonate, causes a precipitation of diguanidine disodium ferrocyanide in a very few minutes in the form of small flat crystals which have a waxy lustre when dry. The compound when recrystallized forms large yellow crystals of $Gu_2Na_2Fe(CN)_6.6H_2O$.

Similarly, the guanidine potassium salt may be formed by mixing saturated solutions of guanidine carbonate and potassium ferrocyanide causing a precipitation of $Gu_2K_2Fe(CN)_6.5H_2O$ as large, light yellow crystals which are difficult to dry.

Guanidine ammonium ferrocyanide may now be formed by adding five mols of solid ammonium carbonate to a saturated solution of diguanidine disodium or dipotassium ferrocyanide at 45° C. After mechanically agitating the mixture for one-half hour and cooling to about 10° C., a fine, light yellow precipitate was obtained having the formula $Gu_2(NH_4)_2Fe(CN)_6$. An excess of ammonium carbonate is essential in this case as otherwise diguanidine disodium or dipotassium ferrocyanide will precipitate out.

Another satisfactory method of making the ammonium salt is to add solid diguanidine disodium ferrocyanide with six molecules of water of crystallization and solid ammonium carbonate in the ratio of 1:5 alternately to water heated to 45° C. with mechanical agitation. After one-half hour, the solution was cooled to 15° C. whereupon diguanidine diammonium ferrocyanide was precipitated.

In a similar manner, the above compounds may be formed using other soluble guanidine salts such as the hydrochloride and nitrate, although the carbonate is preferred due to its ease of solution in water.

These complex ferrocyanides containing guanidine may be used for the preparation of iron blues or light sensitive work, such as blueprints, inasmuch as they exhibit light instability. They are also useful as moth larvae repellents.

While the invention has been described with particular reference to specific embodiments, it is to be understood that it is not to be limited thereto but is to be construed broadly and restricted solely by the scope of the appended claims.

This application is a division of Serial No. 337,629, filed May 28, 1940, Patent No. 2,289,547.

I claim:
Diguanidine diammonium ferrocyanide.

URNER LIDDEL.